No. 870,355. PATENTED NOV. 5, 1907.
J. A. GALLAGHER.
SHUTTLE.
APPLICATION FILED APR. 6, 1907.
Fig. 1.
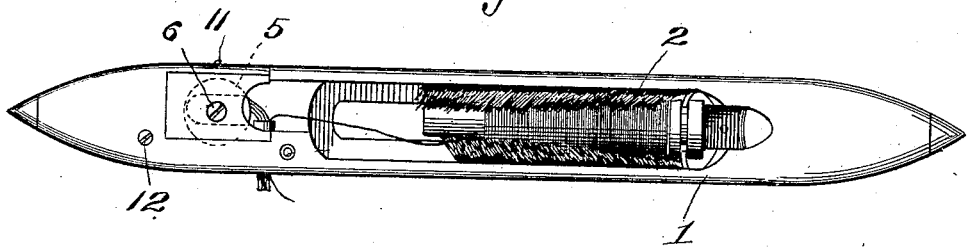
Fig. 2.
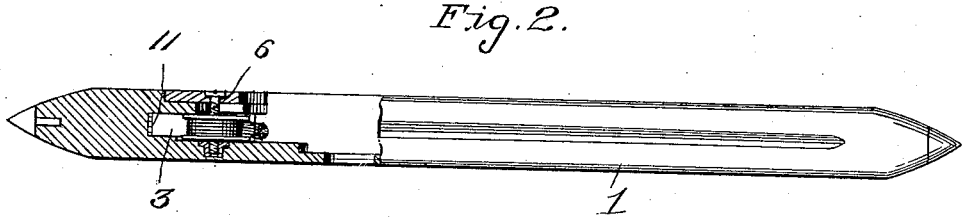
Fig. 3.
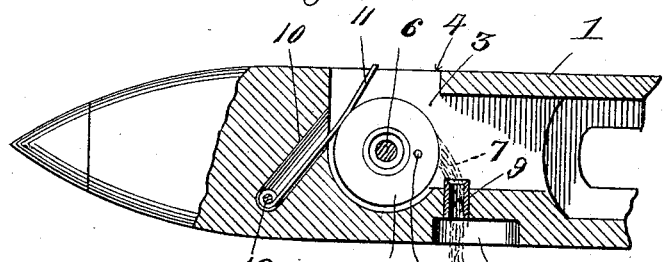
Fig. 4.
Inventor
James A. Gallagher,
Witnesses
J. T. L. Wright.
C. Bradway
By Victor J. Evans
Attorney

UNITED STATES PATENT OFFICE.

JAMES A. GALLAGHER, OF LANCASTER, PENNSYLVANIA.

SHUTTLE.

No. 870,355.　　　Specification of Letters Patent.　　　Patented Nov. 5, 1907.

Application filed April 6, 1907. Serial No. 366,802.

*To all whom it may concern:*

Be it known that I, JAMES A. GALLAGHER, a citizen of the United States, residing at Lancaster, in the county of Lancaster and State of Pennsylvania, have invented new and useful Improvements in Shuttles, of which the following is a specification.

This invention relates to shuttles for weaving machines and relates more particularly to a drag replenishing device for the shuttle.

According to the usual practice, a shuttle is provided with a drag in the form of a small piece of woolen yarn that is inserted through an eye in the shuttle and pegged fast thereto. Since the drag is quickly worn away, new ones have to be substituted from time to time and to do this, the loom fixer takes out the peg and puts in a new drag. This operation, besides being tedious, takes a great deal of time, and as the drags have to be renewed every day or oftener, a considerable expense is attached to keeping the shuttles in repair.

The present invention has for one of its objects to overcome the objections above referred to by providing a drag replenishing device, whereby the drag can be renewed from time to time by the weaver in a simple and expeditious manner.

A further object of the invention is the provision of a spool mounted in the shuttle on which the woolen yarn is carried, one end of which being protruded from the body of the shuttle to operate as a drag.

A further object of the invention is the employment, in connection with a spool-carrying drag, of a brake whereby the spool is prevented from unwinding except when the yarn on the spool is deliberately pulled or unwound by the weaver to provide a new drag.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a plan view of a shuttle. Fig. 2 is a side elevation thereof partly in section. Fig. 3 is a fragmentary sectional view of the drag-carrying spool and brake therefor drawn on an enlarged scale. Fig. 4 is a side view of the spool of the drag replenishing device.

Similar reference characters are employed to designate similar parts throughout the several figures of the drawings.

Referring to the drawing, 1 designates the shuttle in which is arranged in the usual manner the weaving spool 2. At one end of the shuttle is a chamber 3 that is open at one side as indicated by 4, Fig. 3, for permitting of the removal and insertion of the drag-carrying spool 5. This spool is held in place by a screw 6 that serves as a pivot on which the spool turns. Wound on the spool is a woolen yarn or other suitable material designated by 7, whose inner end is fixed to the spool by engaging under the pin 8. The yarn 7 passes outwardly from the chamber 5 through a guide 9, the free end of the yarn forming the drag. The spool is of sufficient capacity that the yarn wound thereon will serve to form any desired number of drags by pulling or unwinding the yarn step by step as the drags wear away and require to be renewed.

In order to hold the spool 5 stationary, so that the yarn 7 will not automatically unwind, a suitable brake device is employed for yieldingly engaging the spool. The body of the shuttle is provided with a recess 10 arranged tangentially to the spool and in this recess is a leaf spring 11 that bears on the periphery of the spool. This spring is held in place by a screw 12 extending into the body of the shuttle from the top, as shown in Fig. 1. The free end of the spring or brake 11 is accessible through the open side 4 of the chamber 3 so that the spring can be engaged by the finger and moved out of the way of the spool when the latter is removed for supplying another yarn. To remove the spool, the screw 6 is taken out and the spool can then be slipped bodily out of the open side 4 of the chamber 3. In order to enable the attendant to grip the worn end of the yarn, the body of the shuttle is provided with a slot 13 at the outer end of the guide 9, whereby the attendant can insert the thumb and first finger into the slot to take hold of the end of the yarn when a new drag is to be made.

From the foregoing description taken in connection with the accompanying drawings, the advantages of the construction and of the method of operation will be readily apparent to those skilled in the art to which the invention appertains. In operation, the parts are in the position shown in Fig. 3. When the free end of the yarn 7 becomes worn, the attendant takes hold of the yarn and pulls outwardly on the same so that the spool 5 unwinds. This positive pull on the yarn will cause the brake 11 to yield, and as soon as the attendant ceases pulling on the yarn, the brake will positively hold the spool. The yarn is pulled out sufficiently to form a drag. This operation is repeated from time to time as the drag has to be renewed.

I have described the principle of operation of the invention, together with the apparatus which I now consider to be the best embodiment thereof, and desire to have it understood that the apparatus shown is merely illustrative and that such changes may be made when desired, as are within the scope of the claims.

Having thus described the invention, what I claim is:—

1. The combination with a shuttle, of a drag replenishing device mounted on the shuttle, said device comprising means for holding a supply of drag forming material, and means for permitting the material to be drawn out piece by piece for renewing the drag.

2. The combination with a shuttle, a drag-carrying spool mounted therein, and means for yieldingly holding the spool stationary.

3. The combination of a shuttle, a removable spool therein, a drag yarn thereon, and a brake in the shuttle for yieldingly holding the spool stationary.

4. The combination of a shuttle, a drag-carrying spool, a screw pivot for holding the spool in place, and a spring arranged in the shuttle to engage the spool to form a brake therefor.

5. The combination of a shuttle provided with a chamber open to one side, a drag-carrying spool removable through the open side of the chamber, a pivot for holding the spool in the chamber, a guide for the drag through which the latter is drawn from the spool, and a brake releasably engaging the spool.

6. The combination of a shuttle having a chamber opening at one side, a drag-carrying spool in the chamber and removable from the open side thereof, a removable pivot for the spool, a guide through which the drag is drawn from the spool, and a spring arranged in the chamber to engage the periphery of the spool and having its free end accessible through the open side of the chamber.

In testimony whereof, I affix my signature in presence of two witnesses.

JAMES A. GALLAGHER.

Witnesses:
WM. H. KREADY,
B. C. KREADY.